Figure 1:

United States Patent [19]
Takase et al.

[11] 3,958,067
[45] May 18, 1976

[54] GRANULAR ASPHALTS

[75] Inventors: Takashi Takase, Narashino;
Tsunekazu Hayashi, Mitaka;
Hirokazu Saitoh, Ohmiya, all of
Japan

[73] Assignee: Mitsuboshi-Sangyo Co., Ltd.,
Tokyo, Japan

[22] Filed: Oct. 3, 1973

[21] Appl. No.: 403,075

Related U.S. Application Data

[63] Continuation-in-part of Ser. No. 151,571, June 9, 1971, Pat. No. 3,783,000.

[30] Foreign Application Priority Data
June 11, 1970 Japan.............................. 45-49845
June 11, 1970 Japan.............................. 45-49846
June 11, 1970 Japan.............................. 45-49847

[52] U.S. Cl............................. 428/402; 106/273 R;
428/403; 428/407; 428/489
[51] Int. Cl.².......................................... B32B 5/16
[58] Field of Search................... 161/168, 236, 271;
423/460, 461; 208/3, 22; 106/273 R, 280,
281 R; 428/402, 403, 407, 489

[56] References Cited
UNITED STATES PATENTS

| | | |
|---|---|---|
| 1,925,282 | 9/1933 | Robinson............................. 117/21 |
| 2,013,808 | 9/1935 | Robinson........................ 106/281 R |
| 2,178,770 | 11/1939 | Zaisser............................ 260/758 X |
| 2,896,261 | 7/1959 | McAfee.................................. 264/9 |
| 3,758,035 | 9/1973 | Ushiku et al.................... 241/154 X |
| 3,762,975 | 10/1973 | Iwasaki et al................... 161/236 X |
| 3,783,000 | 1/1974 | Takase et al......................... 117/21 |

*Primary Examiner*—William J. Van Balen
*Attorney, Agent, or Firm*—Wenderoth, Lind & Ponack

[57] ABSTRACT

This invention provides a novel granular asphalt which comprises granules having the size of from about 0.074 to about 10 mm and being in the shape of a polyhedron having at least one acute angle. The granular asphalt has excellent properties. In particular, it can be melted rapidly and easily with small thermal capacity and slight heating, without causing thermal decomposition, denaturing and air pollution. The granular asphalt is useful, for example, for producing asphalt compound, cutback asphalt, rubberized asphalt, etc., for use in water-proofing, paving, sealing, etc., and for making asphalt block, asphalt tile, asphalt roofing, tarpaulin paper, flooring sheet, paint and varnish, etc.

6 Claims, 2 Drawing Figures

GRANULAR ASPHALTS

CROSS REFERENCE TO RELATED APPLICATION

This application is a continuation-in-part of our copending application Ser. No. 151,571 filed June 9, 1971, now U.S. Pat. No. 3,783,000.

This invention relates to novel granular asphalt comprising granules having suitable size for work and being in the shape of a polyhedron having at least one acute angle.

There have been proposed many methods for producing granular or powdery (i.e. small granule) asphalt.

One method is to produce powdery asphalt by dispersing melted asphalt in water using an emulsifier and spraying the resulting asphalt emulsion in a drying tower to remove the water by evaporation, and to obtain blob powder. The obtained powder is unstable against moisture and returns to emulsion because of the remaining emulsifier, filler, acid, alkali, etc. which have great water or moisture absorbing property, on and/or in the powder.

Another method is to produce powdery asphalt by crushing block asphalt with a large amount of water (about 8 times). But this method is not used practically since it is necessary to use a large scale apparatus for removing the water by heating, vacuum-evaporating or freezing and takes a long time to operate. Further, the particles are denatured by lengthy heating and water treatment.

Still another method is to produce powdery asphalt by putting melted asphalt into cooling water. This method also has such defects as the obtained powder is a blob and not uniform in quality because of thermal decomposition during lengthy melting and denaturing by rapid cooling.

Further method is to produce powdery asphalt by crushing block asphalt together with different materials such as graphite and sulfur. The obtained powder is a mixture of asphalt and the different materials. It is the most important defect of this method that no pure asphalt powder is obtained, and therefore the different materials must be removed before use of the asphalt in most cases.

It is known that when block asphalt melts, the lower molecular weight component firstly melts and flows while the higher molecular weight component remains as block. In conventional methods, in order to melt the block component in a mixture of block and melted asphalt in a melting furnace, much heating is necessary which results in thermal decomposition and denaturing of the asphalt. Thus no uniform asphalt having original physical properties is obtained. Also since the asphalt is forced to be over-heated, for example, for about 1–2 hours, a fall back phenomenon, that is, decreasing of the softening point by several tens of degrees, may take place. When the asphalt subjected to this fall back phenomenon is used for practical applications e.g. water-proofing, it shows the defect of flowing down at elevated temperatures as in summer.

Further according to conventional methods, it is very difficult to obtain various asphalts having various penetration degrees, softening points and ductilities as desired, because it is necessary either to mix two or more kinds of melted asphalts of different grades or to mix a melted asphalt with a block asphalt having different properties and then to melt the resulting mixture. But these methods are not only complicated to operate but also unsuitable for obtaining the asphalt having the desired properties uniformly in large scale production.

It is an object of this invention to provide granular asphalt comprising granules having the most suitable size for various treatment and working, and being in the shape of a polyhedron having at least one acute angle. It is another object of this invention to provide granular asphalt which can be melted rapidly and easily with small thermal capacity and slight heating without having been denatured or decomposed unlike that obtained by conventional methods. Further objects and advantages of this invention will be apparent to one skilled in the art from the following disclosure and discussion.

This invention provides granular asphalt which comprises granules having the size of from about 0.074 to about 10 mm and being in the shape of a polyhedron having at least one acute angle.

Herein the term "asphalt" includes straight-run asphalt, blowing asphalt, catalitic blowing asphalt, rubberized asphalt, asphalt compound, resin-mixed asphalt and the like.

The granular asphalt of this invention can be obtained easily by using the apparatus disclosed in U.S. patent application Ser. No. 148,813 titled "Crusher for Tenacious Material Such as Asphalt", now U.S. Pat. No. 3,758,035, but cannot be obtained by any conventional methods.

Figure 2:
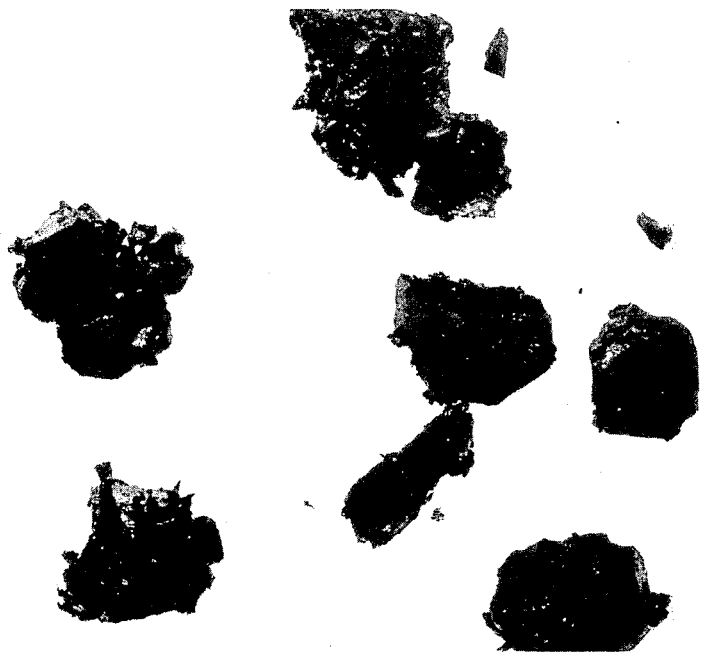

The accompanying drawings, FIG. 1 and FIG. 2, are the photographs of the granular asphalt of this invention, enlarged four times, that is, one smallest section shown in FIG. 1 and FIG. 2 indicating 1 mm square.

The granular asphalt of this invention can be melted rapidly and easily with small thermal capacity and slight heating. Therefore almost no thermal decomposition, almost no air pollution such as smoke and bad smell, almost no denaturing and the like take place during treatments for practical uses.

If desired, flaky asphalt may be obtained by rolling the granular asphalt of this invention between a pair of rollers.

When the granular asphalt having the desired penetration degree, softening point or ductility is required, it can easily be obtained by mixing two or more asphalts of different grades in the predetermined ratio and heating and melting the mixture.

When melted asphalt is required, it can easily be obtained by putting the granular asphalt of this invention into a small heating apparatus and removing the melted asphalt continuously in a short time. If desired, the melted asphalt can be removed intermittently using a stopper. Thus no large scale heating apparatus, no stock tank, and no carrying means are necessary. Since only a movable small heating apparatus can be used for obtaining the melted asphalt, the work can be carried out at any desired place and time. Further the desired kind of asphalt can be used conveniently without causing a fall back phenomenon and change in quality, unlike the conventional methods.

Since the granular asphalt of this invention is a simple substance in pure state, admixture with other asphalt and other materials, and various uses of the resulting mixture at normal temperature or under heating are possible. Further the granular asphalt of this invention can be used for impregnating other materials such as felt, paper, fabric, etc. or for coating various materials.

As a result of excellent properties of the granular asphalt of this invention, plant equipment and process can be simplified, no large fire is required, production control becomes easy and the number of workmen can be reduced.

The granular asphalt of this invention can be used for various purposes. The following applications are examples thereof.

ASPHALT COMPOUND

One of applications of the granular asphalt of this invention relates to the production of asphalt compound.

In conventional methods, asphalt compound is produced by blending linseed oil, rosin, gilsonite and the like with melted blowing asphalt at a high temperature in a furnace in order to improve the properties of blowing asphalt, such as elongation, heat sensitivity, adhesion, impact resistance and workability. The resulting melted mixture is poured into a mold and cooled to form solid asphalt compound. For practical use, the compound is crushed as fine as possible in order to hasten its melting speed and then slowly heated again at a high temperature with agitation in a melting kiln. At this stage, the properties of the compound are very often changed, particularly when using higher temperatures, because the additives are decomposed, the asphalt is oxidized and so on. The asphalt compound, when practically used, is liable to have lower penetration and ductility, and higher softening point than the original compound when just produced. Thus the asphalt compound for practical use has a considerable difficulty in thermal control in that it must be melted at the lowest temperature and in as short a time as possible. The temperature of the asphalt compound is liable to elevate too high, therefore the pouring is conducted dividedly, usually in more than three times. Thus the conventional methods have the following defects: melting of the asphalt requires a long time at a high temperature, the mixing procedure requires lower temperatures in order to avoid thermal decomposition, careful thermal control is required for melting the asphalt compound, and the cooled solid is crushed by hand.

These defects of the conventional methods can be improved greatly by using the granular asphalt of this invention. The granular asphalt is melted rapidly with a little heat in a heating mixer and the additives can be added and mixed immediately. Therefore the resulting compound is easily obtained without the additives being decomposed by heat. After being cooled to a normal temperature, this compound can be easily crushed into granules with the use of the apparatus disclosed in U.S. Pat. No. 3,758,035. For practical use, if the required amount of the compound is heated with agitation in a small melting kiln, the compound can be melted at a low temperature in a short time. The operation may be conducted in a continuous manner, maintaining the suitable temperature.

Further, the granular asphalt coated by the additives may be obtained by heating the granular asphalt at a temperature slightly lower than the melting point and then mixing the additives with it. By cooling the resulting asphalt to a normal temperature in a mold, coarse solid is obtained. After being crushed into fine particles, the compound is heated again upon practical use. Instead of heating granular asphalt, it is possible that granular asphalt is mixed with the additives at a normal temperature and the mixture is heated upon practical use. Whether the granular asphalt is heated or is mixed with the additives at a normal temperature depends on the melting point of the additives, e.g. that of rosin.

CUTBACK ASPHALT

The granular blowing asphalt of this invention can be used for the production of cutback asphalt. In the conventional methods for the production of cutback asphalt using melted blowing asphalt, the asphalt content cannot be high because gelation takes place immediately, and even when the content is considerably low, the cutback asphalt must be used within a short time because gelation proceeds with time. According to this invention, these disadvantages are completely overcome and cutback asphalt can easily be obtained by merely dissolving the granular asphalt in a solvent at the working site.

RUBBERIZED ASPHALT

The granular blowing asphalt of this invention can also be used for producing rubberized asphalt, overcoming various defects, such as thermal decomposition of the rubber and difficulty in thermal control, of conventional methods due to the use of melted blowing asphalt. Rubberized asphalt can easily be obtained by spraying a rubber latex over the granular asphalt such as blowing asphalt with stirring in a mixer and drying the granular asphalt coated with a thin film of the rubber. No thermal decomposition or denaturing takes place, unlike the conventional methods.

WATER-PROOFING

The granular asphalt of this invention can be applied in water-proofing work.

The granular asphalt of this invention has a rapid melting property and, hence, the size of the heating furnace can be made considerably small. Thus, it is possible to continuously supply the granular asphalt into the movable heating furnace on the working site such as concrete slabs of a roof, to spread the melted asphalt as the heating furnace is moved, and to adhere thereonto roofings, or non-woven fabrics, thus carrying out water-proofing work in a continuous manner.

Because the heating furnace can be of a small size, by using several small furnaces, it is possible to carry out working simultaneously from several sides in a wider working area. Similarly, by using several small furnaces, it is also possible to carry out working of the second and the third layers, during working of the first layer.

Thus, the working period can be greatly shortened.

Also in cases where two or more kinds of asphalts having different qualities, depending on the locations or the other conditions, must be used, it is possible to perform very easily the after-treatments such as cleaning.

Thus, by using the granular asphalt of this invention, such problems as difficulties in melting of block asphalt, transportation and spreading of melted asphalt by hand in the conventional methods can be solved. Accordingly, the number of workmen required can be reduced, the working time can be very much hastened and deterioration of asphalt due to thermal decomposition can be avoided, thus attaining highly reliable asphalt water-proofing.

PAVING

An easy paving method for roads, bridges, floors, etc., can be carried out by using the granular asphalt of this invention mixed with crushed stone, gravel, sand or other aggregate.

The required asphalt mixture for paving work can be easily obtained by using the granular asphalt of this invention, for example, straight-run asphalt, blowing asphalt, rubberized asphalt, or mixture thereof. Thus, any conventional aggregate material, for example, crushed stone, gravel, sand or blended mixtures thereof in specified ratios and quantities, are mixed with the granular asphalt on the working site to obtain the asphalt mixture. The aggregate and the asphalt are mixed at the normal temperature and then the mixture is heated or the aggregate previously heated at a high temperature is mixed with the asphalt.

When the granular asphalt of this invention is used, unlike the conventional methods, no tank lorry is required, and large scale machine equipment such as the melting kilns, storage tanks, melted material weighing machines for the melted materials, hot firing furnaces, etc., are not necessary. As a result, plant equipment can be simplified, no large fire is required, production control becomes easy and the number of workmen can be reduced.

SEALING

The granular asphalt of this invention can also be used for a simple and easy filling work of required efficiency for voids, joints, cracks, etc., among and between materials used in structures and buildings, e.g. joints of wood block, asphalt block, brick pavement, portland cement, concrete pavement, etc. It is possible that the granular asphalt be put into voids, etc. and then heated to seal the voids.

ASPHALT BLOCK

The granular asphalt of this invention can also be used for producing asphalt blocks. Asphalt blocks are produced by mixing the granular blowing asphalt with crushed stone, slag, river sand, and limestone powder individually in a heating mixer with stirring, blending each aggregate covered by the blowing asphalt together, charging the resulting mixture into a mold and pressing it. Since the granular blowing asphalt melts rapidly with slight heating, various defects of conventional methods using block blowing asphalt can be completely overcome. According to this invention, there can be obtained asphalt blocks having high densities.

ASPHALT TILE

Similarly, asphalt tiles can easily be produced by mixing the granular blowing asphalt of this invention with a softener, one or more binders such as gilsonite, one or more fillers such as asbestos, calcium carbonate, etc., and one or more pigments in a banbury mixer with heating, rolling the resulting mixture between a pair of rollers to obtain a thick sheet, calendering the sheet with a calender roll to the desired thickness, cooling the sheet gradually and cutting the sheet with a punch to the desired size. Since the asphalt in this invention is in the form of granule, no lengthy heating at high temperatures is required. Nevertheless the softening point of the granular asphalt of this invention is the same as that of the block asphalt used in the conventional methods. Furthermore various defects of conventional methods such as evaporation of volatile components, thermal denaturing, generation of smoke and bad smell can be overcome by using the granular blowing asphalt of this invention.

ASPHALT ROOFING

In making asphalt roofing, etc., raw paper composed of organic or inorganic fibers was been dipped in melted straight-run asphalt. After then dipping into melted blowing asphalt, the material was passed between heating rolls to remove excess blowing asphalt and develop the specified thickness.

The use of granular asphalt of this invention is characterized by the following: melting kilns become unnecessary for the major manufacturing processes including melting, transportation, etc., of the asphalt. Since the weighing and carrying of the granular asphalt is easier than in the case of liquid material, process and equipment can be curtailed, simplified and automated to manufacture products of better quality more safely.

In making asphalt roofing, when the knitted material, textile fabric, non-woven fabric, mesh material or other base material is passed between a pair of heating rolls heated at 170°C, for example, placed horizontally, the granular asphalt of this invention is supplied between each side of the base material and the adjacent roll to simultaneously conduct the melting, impregnation and processing.

WATER-PROOF ASPHALT MATERIALS

Various kinds of water-proof asphalt materials can be easily and quickly obtained at low cost. When the granular asphalt is thus employed, large-scale plant facilities are unnecessary. In this connection, it is certain that various kinds of products of excellent quality and required physical properties can be manufactured under easy production control in a single equipment.

TARPAULIN PAPER

Similarly, tarpaulin paper can easily be prepared by passing kraft-paper coated with melted granular asphalt between a pair of rolls. By using the granular asphalt of this invention, it is possible to obtain tarpaulin paper from two sheets of kraft-paper each coated with asphalt of different quality. For example, if one sheet of kraft-paper one side of which is coated with asphalt of high penetration is stuck to another sheet of kraft-paper one side of which is coated with asphalt of low penetration, coated sides being confronted with each other, there may be obtained tarpaulin paper having one hard surface and one soft surface.

FLOORING SHEET

In conventional methods, flooring sheet can be produced by rolling asphalt compound which is prepared by mixing stabilizer, filler, pigment, high-viscosity polymerized oil such as linseed oil, etc., with a melted blowing asphalt and either adhering the resulting sheet to asphalt felt or coating it on the asphalt felt and cutting the resulting sheet, for example, to a size of 2–3 cm thick, 1 m wide and about 20 m long. When the granular blowing asphalt of the present invention is used instead of melted blowing asphalt and the granular asphalt is charged directly into high-viscosity polymerized oil in a heating mixer, various defects of conventional methods are overcome and the process can be simplified with increasing efficiency, decreasing the required energy and heating, as mentioned previously.

PAINT AND VARNISH

The granular asphalt of this invention can be applied to paint and varnish. In conventional methods of producing paint and varnish using block blowing asphalt, there are many problems such as thermal control, firing, etc. When solvent is added, the temperature of hot melted asphalt is lowered to such point so as not to lose fluidity of the asphalt, which would be near the boiling point of the added solvent. In such case, a complicated process and commensurate thermal control will be required. If the operation is not proper, it may cause ignition and firing. Such problems can be overcome by using the granular asphalt of this invention, since the granular asphalt can easily be dissolved in solvents.

According to conventional methods, block blowing asphalt or hand cracked blowing asphalt is used. Difficulties and defects of using such block blowing asphalt are as mentioned previously. When the granular blowing asphalt of this invention is used, asphalt paint and varnish can easily be obtained by dissolving the granular asphalt in a volatile solvent or volatile solvent and drying oil with slight heating. The resulting asphalt paint is useful as asphalt primer, damp roofing paint, anti-corrosive paint, roof paint and the like, and the resulting asphalt varnish is useful as baking black varnish, insulation black varnish, enamel, compound and the like.

OTHER APPLICATIONS

Other applications of the granular asphalt of this invention are as follows: admixture for rubber in making rubber tile, shoe soles, packing, boots, bicycle pedals; neck grease used for shaft bearings in the shipbuilding industry; vent-wax in various casting for ventage; black tape for adhesive or electric insulation; printing ink or photogravure ink; safty fuse for dynamite; brake lining; binder for plastics such as bakelite; support for lens polisher; electrolysir; etching for metal; automobile chassis; ballast; water course; etc.

EXPERIMENT

In this experiment, the granular asphalt of the present invention and the conventional block asphalt have been compared in respect of melting property and solubility in solvent.

I. Samples
   Kind of asphalt: Blowing asphalt
   Properties: Penetration (25°C, 100g, 5 sec.) . . . 20–30 Softening point (Ring & Ball Method) . . . 100°C
   Type and weight: Granular asphalt (size 2–3 mm) . . . 50g Block asphalt (45 cm$^3$) . . . 50g II. Testing Methods
   Test 1. Each sample has been charged on a heating tray on an electric heater (temperature 250°C), and the time for completion of melting was determined. (Table 1)
   Test 2. Each sample has been charged in toluol of 300 cc in a beaker, and the time for completion of dissolving was determined. (Table 2)

III. Results

Table 1
Melting Property
Time for melting

| | Left standing in heating tray (charge ratio 10g/min.) | Slowly stirred |
|---|---|---|
| Granular asphalt | 10 min. | 7 min. |
| Block asphalt | 15 min. | — |

Table 2
Solubility in Solvent
Time for dissolving

| | |
|---|---|
| Granular asphalt | 5 min. (Slowly stirred) |
| Block asphalt | After 210 min. 65% melted (It was left standing there, because it was impossible to stir constantly.) |

What is claimed is:

1. A granular asphalt having a grain size of from about 0.074 to about 10 mm and being in the shape of a polyhedron having at least one acute angle.

2. The granular asphalt of claim 1, wherein the asphalt is straight-run asphalt.

3. The granular asphalt of claim 1, wherein the asphalt is blowing asphalt.

4. The granular asphalt of claim 1, wherein the asphalt is catalytic blowing asphalt.

5. The granular asphalt of claim 1, wherein the asphalt is rubberized asphalt.

6. The granular asphalt of claim 1, wherein the asphalt is asphalt compound.

* * * * *